United States Patent
Ye et al.

(10) Patent No.: US 10,703,580 B2
(45) Date of Patent: Jul. 7, 2020

(54) METHOD AND APPARATUS OF REPLENISHMENT IN ASSEMBLY LINE

(71) Applicant: Wistron Corporation, New Taipei (TW)

(72) Inventors: Jiao Ye, New Taipei (TW); Jingang Tong, New Taipei (TW); Kun Xiang, New Taipei (TW); Qiang Jia, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/273,074

(22) Filed: Feb. 11, 2019

(65) Prior Publication Data
US 2020/0109013 A1    Apr. 9, 2020

(30) Foreign Application Priority Data
Oct. 8, 2018    (CN) .......................... 2018 1 1168991

(51) Int. Cl.
| | |
|---|---|
| *B65G 47/38* | (2006.01) |
| *B65G 47/82* | (2006.01) |
| *B65G 47/51* | (2006.01) |
| *B65G 47/90* | (2006.01) |
| *B65G 47/48* | (2006.01) |

(52) U.S. Cl.
CPC ......... *B65G 47/5104* (2013.01); *B65G 47/38* (2013.01); *B65G 47/482* (2013.01); *B65G 47/82* (2013.01); *B65G 47/902* (2013.01)

(58) Field of Classification Search
None
See application file for complete search history.

(56) References Cited

U.S. PATENT DOCUMENTS

| | | | | |
|---|---|---|---|---|
| 5,129,206 A | * | 7/1992 | Kidani | ...................... B07C 5/36 |
| | | | | 53/116 |
| 7,329,081 B2 | * | 2/2008 | Baker | ...................... B65G 1/04 |
| | | | | 414/268 |
| 9,617,082 B2 | * | 4/2017 | Baker | .................. B65G 1/1373 |

FOREIGN PATENT DOCUMENTS

| | | | | |
|---|---|---|---|---|
| CN | 103935731 A | | 7/2014 | |
| CN | 203781337 U | | 8/2014 | |
| CN | 206544747 U | | 10/2017 | |
| CN | 107878988 A | | 4/2018 | |
| EP | 2457851 A1 | * | 5/2012 | ........... B65G 47/901 |
| TW | 201825366 A | | 7/2018 | |

* cited by examiner

*Primary Examiner* — Kavel Singh
(74) *Attorney, Agent, or Firm* — Winston Hsu (57) ABSTRACT

The present invention is related to a replenishment method and device in an assembly line. A usage storage area for storing a first object set and a spare storage area for storing a second object set are defined in the replenishment apparatus. The replenishment apparatus comprises a fixing carrier in the usage storage area and a moving carrier in the spare storage area. The replenishment method comprises driving the moving carrier to move the second object set in the spare usage area to the fixing carrier in the usage storage area when a remaining number of objects in the first object set carried in the fixing carrier is zero and the first object set in the fixing carrier is removed; and moving the moving carrier to leave the fixing carrier and recover to the spare usage area.

18 Claims, 8 Drawing Sheets

METHOD AND APPARATUS OF REPLENISHMENT IN ASSEMBLY LINE

BACKGROUND OF THE INVENTION

1. Field of the Invention

The present invention relates to a method and apparatus of replenishment in assembly line, and more particularly, to a method and apparatus of replenishment in assembly line capable of effectively reducing manpower and manual operations.

2. Description of the Prior Art

In a conventional assembly line, it is usually an operator takes an object by hands to perform product assembly. In other words, the operator in the assembly line has to perform product assembly line, take objects, and walk to take an object box to replenish the object, which requires more manpower and bring working complexity to the operator, to increase error in the assembly line during operation, and also decreases yield rate and efficiency of the assembly line.

In addition, since the conventional assembly line depends on the operator or a replenish operator to examine or calculate whether it is running out of the objects or there is no object at all, the operator may give the wrong answer to the determination to not timely report or discover the shortage to perform correct replenishment, which causes the assembly line to stop by chain effect, and the capacity of the assembly line is influenced.

Therefore, there is a need to improve the assembly line replenishment operation.

SUMMARY OF THE INVENTION

The present invention provides a method and apparatus of replenishment in assembly line capable of effectively reducing manpower and manual operations, to avoid replenishment from being late or mistake.

The present invention provides a replenishment method for a replenishment apparatus, utilized in an assembly line, wherein a usage storage area for storing a first object set and a spare storage area for storing a second object set are defined in the replenishment apparatus, the replenishment apparatus comprises a fixing carrier in the usage storage area and a moving carrier in the spare storage area. The replenishment method includes determining whether a remaining number of the first object set carried in the fixing carrier is zero; determining whether the first object set carried in the fixing carrier has been removed; driving the moving carrier to move the second object set in the spare usage area to the fixing carrier in the usage storage area when the remaining number of objects in the first object set carried in the fixing carrier is zero and the first object set in the fixing carrier is removed; and moving the moving carrier to leave the fixing carrier to return to the spare usage area.

The present invention further provides a replenishment apparatus, for an assembly line, defined with a usage storage area and a spare storage area. The replenishment apparatus includes a fixing carrier, disposed in the usage storage area, configured to store a first object set capable of storing a plurality of objects; a counter, configured to calculate a remaining number of the objects in the first object set of the usage storage area; a moving carrier, disposed in the spare storage area, configured to store a second object set capable of storing a plurality of objects, and to move the second object set from the spare storage area to the fixing carrier of the usage storage area; and a controller, configured to execute the steps of the replenishment method.

The method and apparatus of replenishment of the present invention may move the object set stored in the spare storage area to the usage storage area to instantly provide objects to the assembly line when the object remaining number is zero, the operator has been requested to perform replenishment, the usage storage area has been cleared, and there is the object set stored in the usage storage area, which avoids assembly line from stopping to improve efficiency.

DETAILED DESCRIPTION

Figure 1:
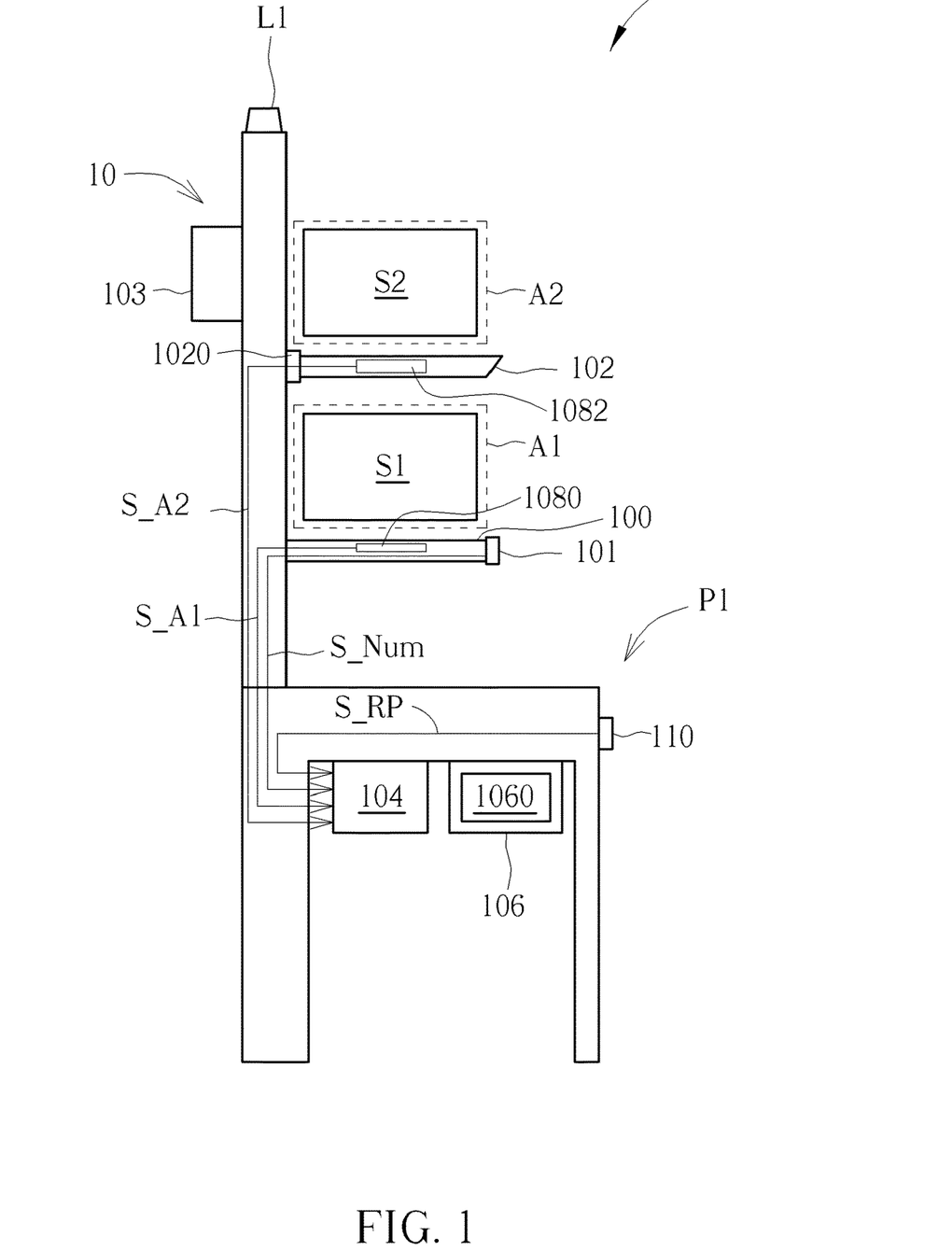
FIG. 1 is a schematic diagram of a replenishment apparatus according to an embodiment of the present invention.

Please refer to FIG. 1, which is a schematic diagram of a replenishment apparatus 10 according to an embodiment of the present invention, wherein the replenishment apparatus 10 is a part of an assembly line 1.

The assembly line 1 is used for performing assembly for a product or a semi-product by different parts or objects, and the replenishment apparatus 10 is used for supplying parts or objects to the assembly line 1. Therefore, the assembly line 1 may receive object and replenishment timely to facilitate manufacturing and improve manufacturing efficiency. To make replenishment apparatus 10 able to supply objects; in this embodiment, the replenishment apparatus 10 at least includes a usage storage area A1 and a spare storage area A2, respectively configured to store object set S1 and object set S2. In this embodiment, the usage storage area A1 may be placed under the spare storage area A2 be stacked vertically, while in other embodiments, the spare storage area A2 may be placed under the usage storage area A1.

In other embodiments of the present invention, the usage storage area A1 and the spare storage area A2 may be placed coplanar or horizontally or in parallel. Each object set S1 or S2 may refer to an object box storing a plurality of objects. As a result, operators or machine of the assembly line 1 may pick up one or more of the objects of the object set S1 in the usage storage area A1 to perform assembly on an operating carrier P1 in the assembly line 1.

In addition, the replenishment apparatus 10 may calculate or assist calculating an object remaining number S_Num of the object set S1 in the usage storage area A1, to timely move downward the object set S2 in the spare storage area A2 to the usage storage area A1 and remove the space for the object set S1 when the object remaining number S_Num of the object set S1 is zero and the object set S1 has been removed from the usage storage area A1, so as to perform replenishment operation and the assembly line may keep working without interruption.

In detail, the replenishment apparatus 10 includes a fixing carrier 100, a counter 101, a moving carrier 102, a driving device 103, a controller 104, a storing unit 106, clearance sensing devices 1080 and 1082, a replenishment signal generation device 110, and an indication light L1. The fixing carrier 100 is formed with the usage storage area A1, and configured to carry the object set S1. The counter 101 and the clearance sensing device 1080 are disposed in the fixing carrier 100. The counter 101 is used for calculating or assists calculating the object remaining number S_Num of the object set S1 in the usage storage area A1.

The clearance sensing device 1080 is used for sensing whether the usage storage area A1 has been cleared to correspondingly generate a sensing signal S_A1 to the controller 104. The moving carrier 102 is fixed on a pivot 1020, and formed with the spare storage area A2 for carrying the object set S2. The clearance sensing device 1082 is disposed in the moving carrier 102, and used for sensing whether the spare storage area A2 has been cleared to correspondingly generate a sensing signal S_A2 to the controller 104. The driving device 103 may include a driving unit and a moving unit, wherein the driving unit may be an electric part that can rotate around a pivot, such as an air cylinder, hydraulic cylinder, or motor. The driving unit is used for driving the moving carrier 102 to rotate around the pivot 1020.

The moving unit may be an electric part that can move toward a certain direction, such as a rack, chain, strap, air cylinder, and hydraulic cylinder. The moving carrier 102 may move the object set S2 stored in the spare storage area A2 to the usage storage area A1, and then drive the moving carrier 102 back to the spare storage area A2. The replenishment signal generation device 110 may be a button or a touch switch, and used for sensing operations of operators in the assembly line 1, to generate a replenishment signal S_RP to the controller 104. The indication light L1 may be controlled by the controller 104, and used for indicating operations of the replenishment apparatus 10.

The storing unit 106 may store a program code 1060 configured to instruct the controller 104 to execute steps of a process. The controller 14 may be a PLC (Programmable Logic Controller), an MCU (Micro Control Unit) or an ASIC (Application-specific Integrated Circuit). The storing unit 106 may be a ROM (Read-only Memory), a RAM (Random-access Memory), a CD-ROM, an Optical Data Storage Device), a Non-volatile Memory (e.g., EEPRM (Electrically Erasable Programmable Read-only Memory) or a Flash Memory), which is not limited.

Figure 2:
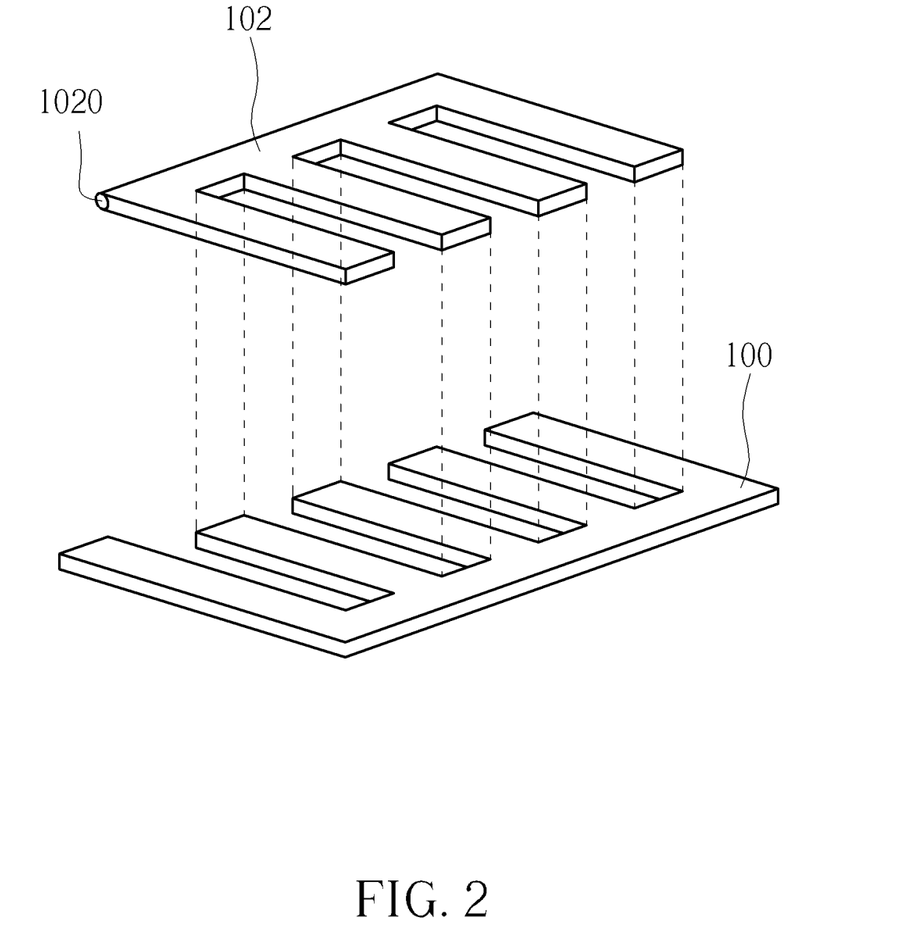
FIG. 2 is an isotropic view of a fixing carrier and a moving carrier of the replenishment apparatus in FIG. 1.

In this embodiment, when performing replenishment, the replenishment apparatus 10 moves the object set S2 stored in the spare storage area A2 downward to the usage storage area A1. To achieve this operation, the fixing carrier 100 and the moving carrier 102 form a complemented comb structure. In detail, please refer to FIG. 2, which is an isotropic view of the fixing carrier 100 and the moving carrier 102. For simplicity, FIG. 2 only illustrates a relative position of the fixing carrier 100 and the moving carrier 102, which is denoted with dashed lines. As can be seen from FIG. 2, the comb structures of the fixing carrier 100 and moving carrier 102 are complementary to each other, i.e., a tooth of the comb structure of the fixing carrier 100 is corresponding to a valley of the comb structure of the moving carrier 102, and a valley of the comb structure of the fixing carrier 100 is corresponding to a tooth of the comb structure of the moving carrier 102. However, the fixing carrier 100 and the moving carrier 102 of the present invention do not limited to the comb structures, those skilled in the art may make modifications to make the moving carrier to correctly move the object set S2 stored in the spare storage area A2 downward to the usage storage area A1 and make the fixing carrier 100 back to the same place.

Figure 3:
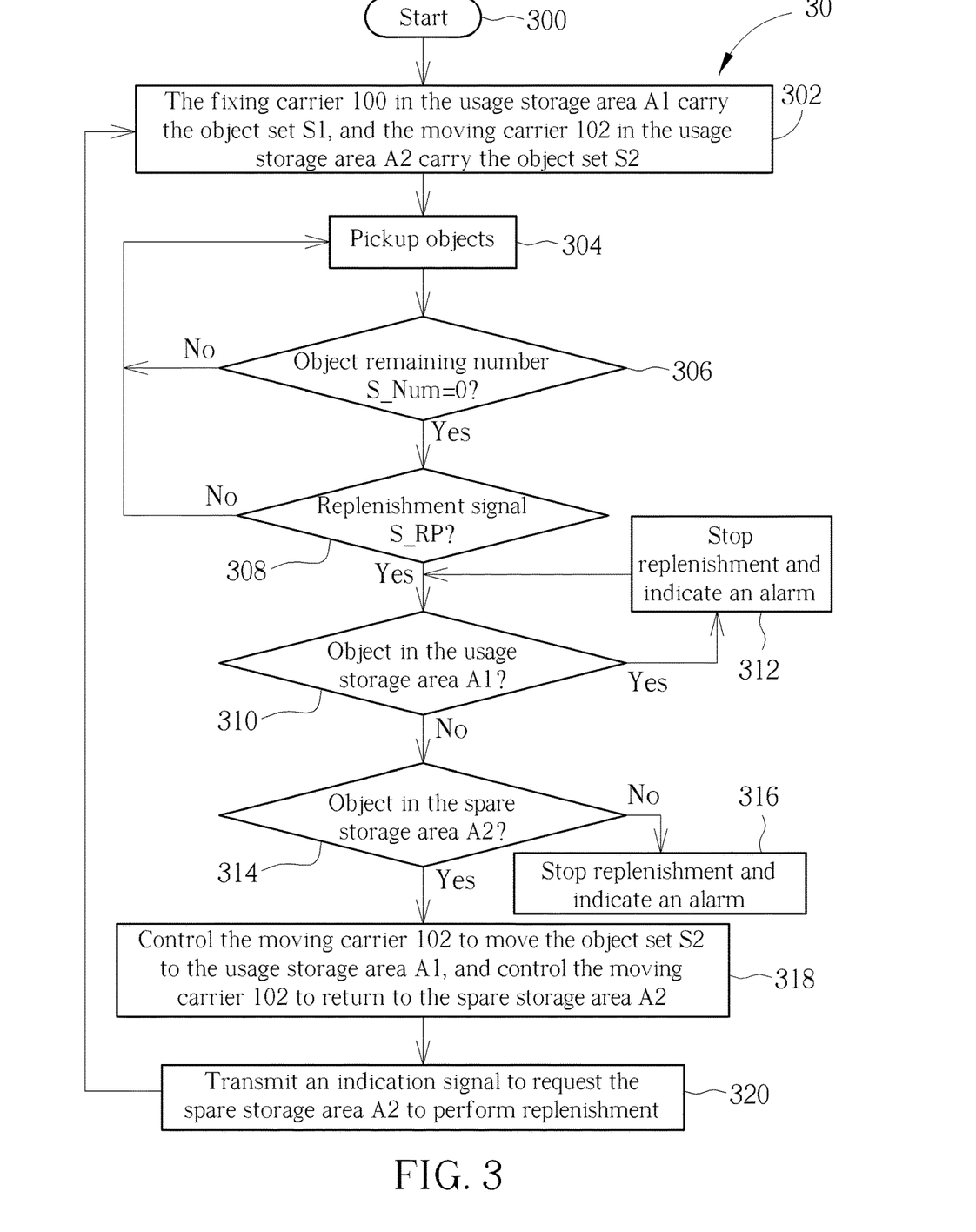
FIG. 3 is a flowchart of a replenishment process according to an embodiment of the present invention.

Regarding operations of the replenishment apparatus 10, please refer to FIG. 3, which is a flowchart of a replenishment process 30. The replenishment process may be used in the assembly line 1 for replenishing the object set S2 stored in the spare storage area A2 to the usage storage area A1 when the replenishment apparatus 10 is running out of the object set S1 stored in the usage storage area A1. The replenishment process 30 may be compiled into a program code 1060 and executed by the controller 104, wherein the replenishment process 30 includes the following steps:

Step 300: Start.

Step 302: The fixing carrier 100 in the usage storage area A1 carry the object set S1, and the moving carrier 102 in the usage storage area A2 carry the object set S2.

Step 304: Operators in the assembly line 1 pickup objects to perform product assembly.

Step 306: Determine whether the object remaining number S_Num of the object set S1 is zero. Go to Step 308 if yes: return to Step 304 if no.

Step 308: Determine whether there is a replenishment signal S_RP. Go to Step 310 if yes; return to Step 304 if no.

Step 310: Determine whether there is any object in the usage storage area A1. Go to Step 312 if yes; go to Step 314 if no.

Step 312: Stop replenishment and indicate an alarm, and return to Step 310.

Step 314: Determine whether there is any object in the spare storage area A2. Go to Step 318 if yes; go to Step 316 if no.

Step 316: Stop replenishment and indicate an alarm.

Step 318: Control the moving carrier 102 to move the object set S2 to the usage storage area A1, and control the moving carrier 102 to return to the spare storage area A2.

Step 320: Transmit an indication signal to request the spare storage area A2 to perform replenishment.

According to replenishment process 30, in the beginning, i.e., Step 302, the object set S1 is stored in the fixing carrier 100 of the usage storage area A1, and the object set S2 is stored in the moving carrier 102 of the usage storage area A2. Then, in Step 304, an operator of the assembly line 1 picks up the object, i.e., pick up the object from the object set S1, to assemble a product. As picking up objects goes, a number of objects in the object set S1 decreases.

Meanwhile, the counter 101 may calculate or assist calculating the object remaining number S_Num of the object set S1. In Step 306, when the controller 104 determines that the object remaining number S_Num is zero according to the calculation result of the counter 101, which means that there is no object in the object set S1, the operator or a machine removes an empty box of the object set S1 in response to a signal indicating that the object remaining number S_Num is zero, and then the operator or the machine presses the replenishment signal generation device 110 to generate the replenishment signal S_RP to notify the controller 104 to activate the replenishment.

When the controller 104 has received the replenishment signal S_RP (Step 308), the controller 104 determines whether there is any object or obstacle in the usage storage area A1 (Step 310) according to the sensing signal S_A1 generated by the clearance sensing device 1080. When the sensing signal S_A1 indicates that there is any object in the usage storage area A1, e.g., an empty box or a package material of the object set S1 is still left in the usage storage area A1, or the operator is cleaning the usage storage area A1, the controller 104 will stop replenishment and transmit an alarm (Step 312), e.g., control an indication light L1 to flash.

On the other hand, when the sensing signal S_A1 indicates that the usage storage area A1 has been cleared, the controller 104 further determines whether there is any object or obstacle in the spare storage area A2 (Step 314) according to the sensing signal S_A2 generated by the clearance sensing device 1082, i.e., whether the object set S2 is stored in the usage storage area A2. When the sensing signal S_A2 indicates that there is no object in the spare storage area A2, which means that a back end replenishment operator does not correctly perform replenishment, or the clearance sensing device 1082 is malfunction with the correct replenishment, the controller 104 will stop the replenishment and transmit an alarm (Step 316), to indicate the related operator to perform replenishment or fix the malfunction.

On the contrary, when the sensing signal S_A2 indicates that there are objects in the spare storage area A2, which means that the object set S2 is stored in the usage storage area A2, the controller 104 performs the replenishment (Step 318, Step 320). When performing the replenishment, the controller 104 moves the moving carrier 102 downward by the moving unit controlled by the driving device 103 to move the object set S2 to the fixing carrier 100 of the usage storage area A1, and then controls the moving carrier 102 to return to the spare storage area A2 by moving up the moving unit after the driving unit rotates the moving carrier 102 (Step 318). At last, the controller 104 transmits an indication signal, e.g., the indication signal controls the indication light L1 to flash with a specific frequency or continuously emit light, to request the replenishment operator (or replenishment machine) to perform replenishment to the spare storage area A2 (Step 320), e.g., provide a new fully-stored second object set to the moving carrier in the spare storage area A2.

Furthermore, the replenishment apparatus 10 uses the counter 101 to calculate or assist calculating the object remaining number S_Num of the object set S1, when the controller 104 determines that the object remaining number S_Num is zero, the operator has been requested to perform replenishment, the usage storage area A1 has been cleared, and there is the object set S2 stored in the usage storage area A2, the controller 104 indicates the moving carrier 102 to move the object set S2 stored in the spare storage area A2 to the usage storage area A1, so the replenishment apparatus 10 may provide instantly objects to the assembly line 1 for product assembly. After the moving carrier 102 has replenished the object set S2 to the usage storage area A1, the controller 104 also indicates the counter 101 to update the remaining number S_Num, so the controller 104 may correctly acquire the remaining number S_Num of the object set S2 stored in the usage storage area A1.

When the moving carrier 102 move the object set S2 stored in the spare storage area A2 to the usage storage area A1 to perform replenishment, in order to make the moving carrier 102 able to return back to the spare storage area A2 for cycling usage, the present invention uses the complementary comb structures of the fixing carrier 100 and the moving carrier 102 to make the valley adapted to an extracting direction of the assembly line 1 after the object set S2 has been moved to the usage storage area A1. In detail, please refer to FIG. 4A to FIG. 4D, which illustrates operations of replenishment performed by the replenishment apparatus 10.

Figure 4A:
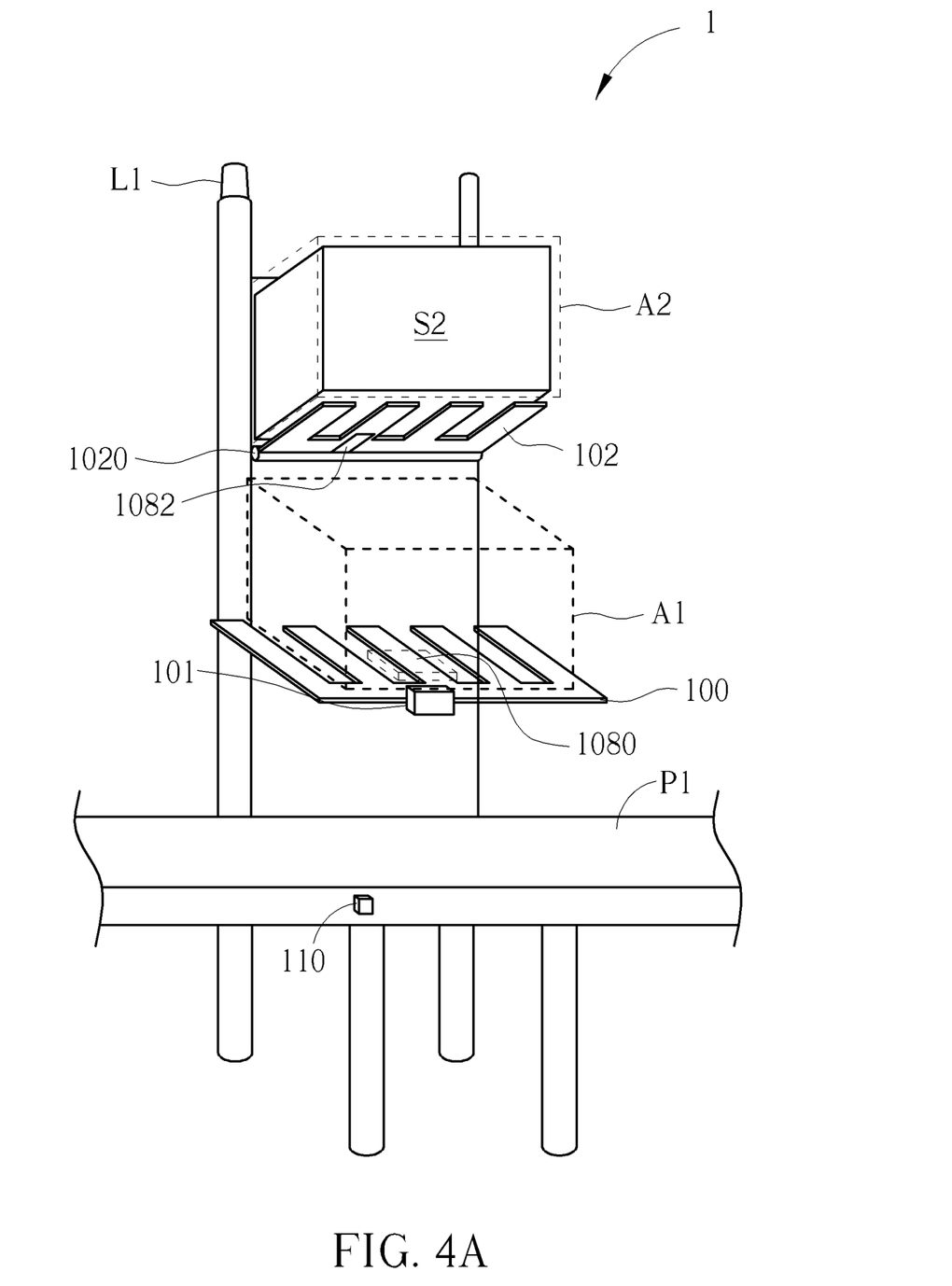
FIG. 4A to FIG. 4D illustrates operation of the replenishment apparatus in FIG. 1.

First, FIG. 4A illustrates a status showing that the controller 104 is about to perform Step 318 in the replenishment process 30, i.e., the object remaining number S_Num of the object set S1 is zero, the operator of the assembly line 1 has remove the empty box of the object set S1, and the replenishment signal generation device 110 has been pressed to notify the controller 104 to activate replenishment; meanwhile, the clearance sensing device 1080 determines that there is no object in the usage storage area A1, and the clearance sensing device 1082 determines that there are objects in the spare storage area A2.

Figure 4B:
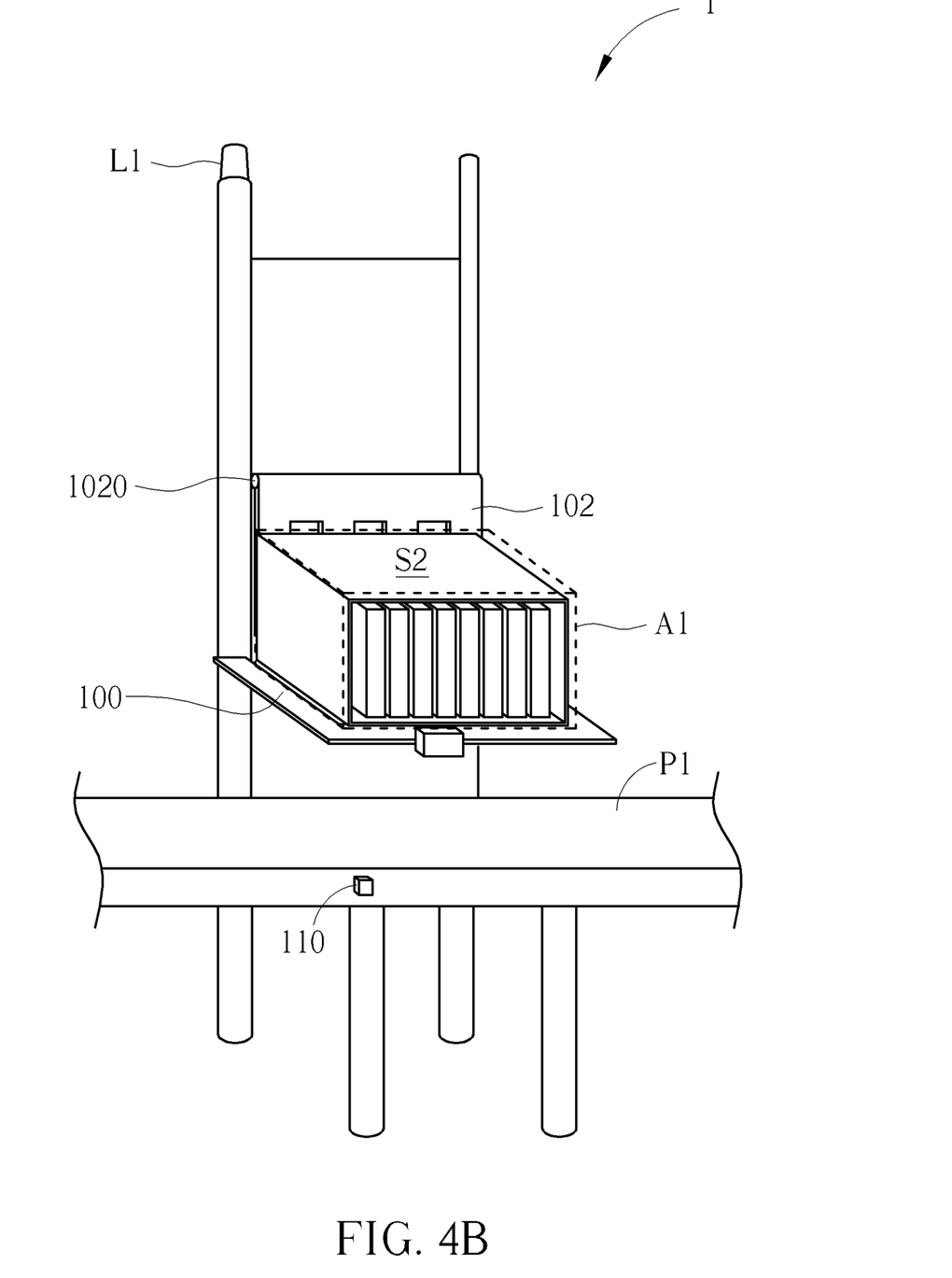
Figure 4C:
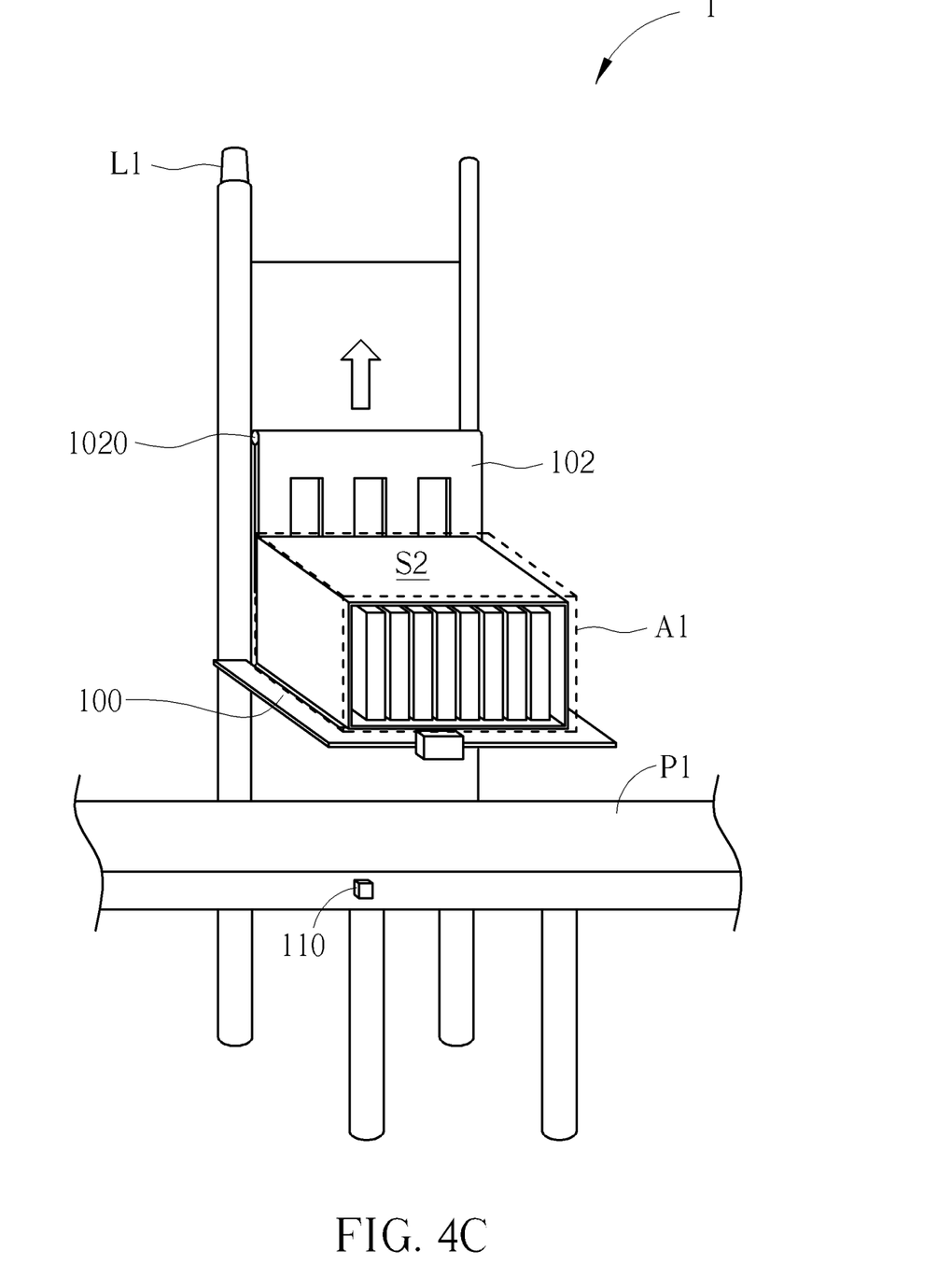
Figure 4D:
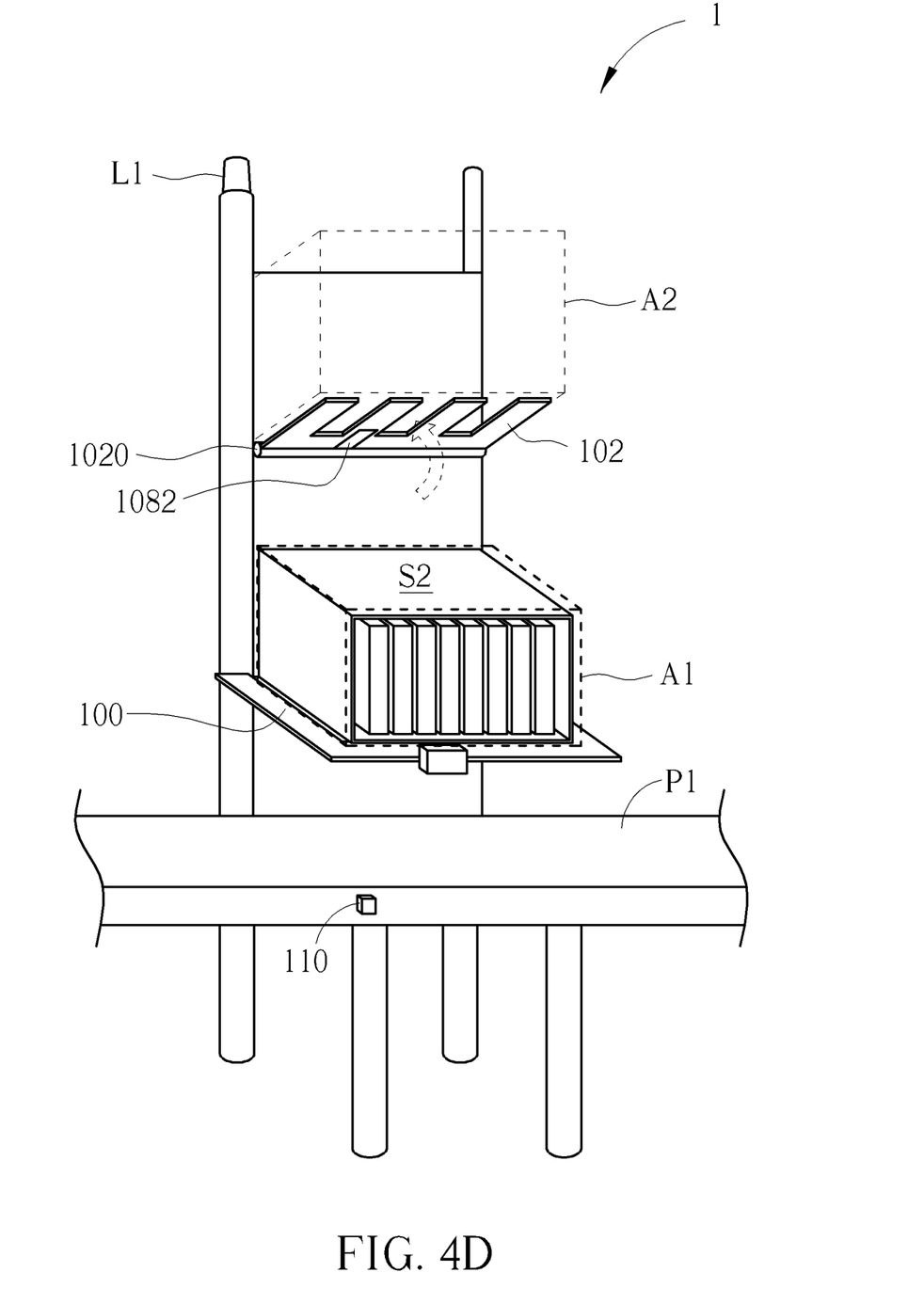

When replenishment starts, the controller 104 moves the moving carrier 102 downward by the moving unit until the object set S2 is placed in the fixing carrier 100, and then controls the driving unit to rotate the moving carrier 102 from a horizontal position to a vertical position, as shown in FIG. 4B. Due to the complementary comb structures of the fixing carrier 100 and the moving carrier 102, the teeth of the moving carrier 102 may move over the valleys of the fixing carrier 100 during the rotation. As a result, as shown in FIG. 4C, the moving unit may pull up the moving carrier 102 in the vertical position to its original place. At last, as shown in FIG. 4D, the driving unit may rotate the moving carrier 102 upward from the vertical position to the horizontal position; meanwhile, the driving unit may notify the replenishment operator to perform replenishment to the spare storage area A2.

As can be seen from above, when the object remaining number S_Num of the object set S1 stored in the usage storage area A1 is zero, the operator has been requested to perform replenishment, the usage storage area A1 has been cleared and there are objects in the usage storage area A2, the replenishment apparatus 10 will move the object set S2 stored in the spare storage area A2 to the usage storage area A1, to instantly provide objects to the assembly line 1 for product assembly.

Noticeably, the replenishment apparatus 10 or the replenishment process 30 is one of the embodiments of the present invention, those skilled in the art may make modifications or alterations accordingly, which is not limited. For example, in other embodiments, the counter 101 may be an infrared sensor configured to calculate the object remaining number S_Num of the object set S1 each time the operator picks up an object. Or, each object in the object set S1 may be equipped with a sensing tag, and the counter 101 may be a wireless sensor for sensing the sensing tag, to calculate the object remaining number S_Num.

In addition, in another embodiment, the counter 101 may be a weight sensing device, and store weights of a package and an object of the object set S1; as a result, the counter 101 may determine the object remaining number S_Num of the object set S1 by sensing the weight of the object set S1. In addition, the counter 101 may be a barcode reader for reading a barcode of an object every time the operator or machine picks up the object in the assembly line 1, to generate the corresponding object remaining number S_Num. Or, the counter 101 may be a touch switch for calculating the object remaining number S_Num of the object set S1 every time the operator presses the touch switch when picking up the object in the assembly line 1. Different embodiments of the counter 101 to determine the object remaining number S_Num of the object set S1 may be well-known in the art, which does not limit the present invention.

In addition, in one embodiment of the present invention, the clearance sensing devices 1080 and 1082 are used for determining whether there is any object or obstacle in the usage storage area A1 and the spare storage area A2, which may be light blocker, a proximity sensor, a pressure sensor, and so on, which is not limited. The indication light L1 is used for reflecting the operating status of the replenishment apparatus 10, which may be replaced by a speaker, a display or any kinds of indication device capable of transmitting the signal to the replenishment operator.

Figure 5:
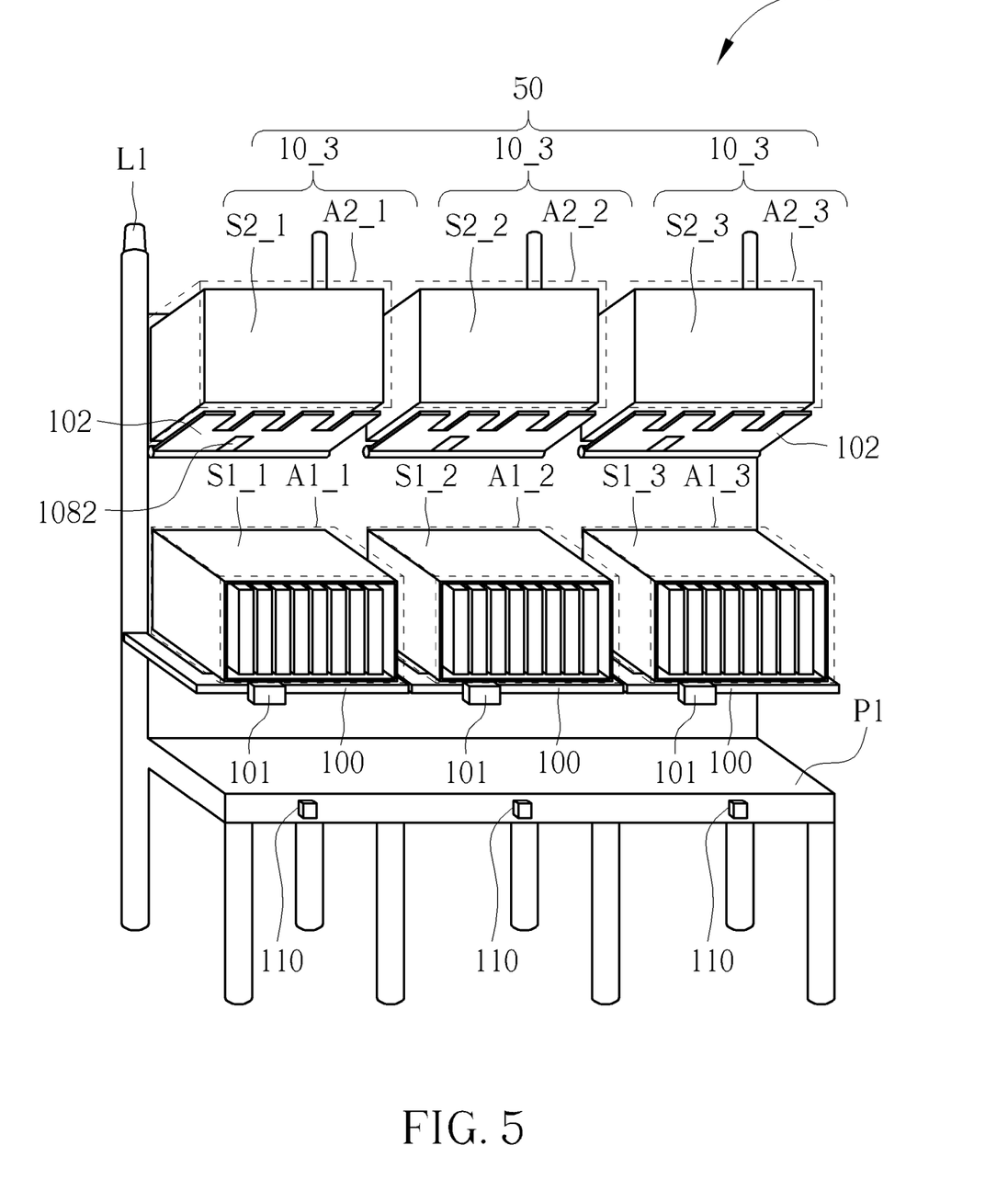
FIG. 5 is a schematic diagram of another replenishment apparatus according to an embodiment of the present invention.

Furthermore, above embodiments describe operations for a single operating platform, in practice, those skilled in the art may make modifications to utilize the present invention in multiple operating platforms, which is not limited. For example, please refer to FIG. 5, which is a schematic diagram of a replenishment apparatus 50 according to an embodiment of the present invention. The replenishment apparatus 50 is similar to the replenishment apparatus 10, and same elements are denoted with same symbols. As shown in FIG. 5, in this embodiment, the replenishment apparatus 50 may be a part of an assembly line 5, the replenishment apparatus 50 integrates three replenishment apparatus 10_1-10_3, to increase replenishment capacity. The usage storage areas A1_1-A1_3 are used for containing object sets S1_1-S1_3 with different objects, so an operator in the assembly line 5 may pick up different objects from the usage storage areas A1_1-A1_3.

Likewise, the spare storage areas A2_1-A2_3 are used for containing object sets S2_1-S2_3, to respectively supply objects to the usage storage areas A1_1-A1_3. As a result, the capacity of the replenishment apparatus 50 may be expanded to contain more objects, and the assembly line 5 may perform replenishment when all the spare storage areas A2_1-A2_3 are cleared to reduce the change that the assembly line 5 runs out of the object sets. In this embodiment, the controller 104 may modify that Step 310 in FIG. 3 into determine whether all the usage storage areas A1_1-A1_3 are empty (i.e., all the objects in the object set S1_1-S1_3 have been removed) to perform the following steps, which is not limited, a manufacturer may decide determination standards according to practical requirements.

Compare with the prior art, the conventional assembly line can only perform replenishment and determine whether object set is empty by manpower in the assembly line, which adds additional burden to the operator in the assembly line, to reduce efficiency. What is worse, when the operator cannot perform replenishment on time, the assembly line will stop for object shortage to reduce assembly line capability.

In comparison, the replenishment apparatus of the present invention may calculate the remaining number of the objects, perform replenishment when there are objects in the spare storage area, and generate replenishment indication when there is no object in the spare storage area, which is benefit for replenishment for the assembly line. Therefore, the replenishment apparatus of the present invention is capable of increasing operating efficiency of the operator or the operating device, so as to improve assembly line capability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A replenishment method for a replenishment apparatus, comprising:
   a counter calculating a remaining number of objects in a first object set carried in a fixing carrier in a usage storage area;
   a controller determining whether the remaining number of the objects in the first object set carried in the fixing carrier is zero;
   the controller determining whether the first object set carried in the fixing carrier has been removed;
   the controller driving a moving carrier to move a second object set in a spare usage area to the fixing carrier in the usage storage area in response to the determination that the remaining number of the objects in the first object set carried in the fixing carrier is zero and the first object set in the fixing carrier is removed; and
   the controller moving the moving carrier to leave the fixing carrier to return to the spare usage area.

2. The replenishment method of claim 1, wherein the counter calculating the remaining number of the objects in the first object set carried in the fixing carrier in the usage storage area comprises:
   the counter calculating a number of the objects in the first object set being picked up to determine the remaining number.

3. The replenishment method of claim 1, wherein the counter calculating the remaining number of the objects in the first object set carried in the fixing carrier in the usage storage area comprises:
   the counter calculating a weight change of the first object set after any of the objects is picked up from the first object set to determine the remaining number.

4. The replenishment method of claim 1, further comprising:
   updating a remaining number of the objects in the second object set in the usage storage area after the moving carrier has moved the second object set to the fixing carrier.

5. The replenishment method of claim 1, wherein before the controller driving the moving carrier to move the second object set in the spare usage area to the fixing carrier in the usage storage area comprises:
   determining whether there is the second object set in the moving carrier; and
   only in response to the determination that there is the second object set in the moving carrier, driving the moving carrier to move the second object set in the spare usage area to the fixing carrier in the usage storage area.

6. The replenishment method of claim 1, wherein after the controller moving the moving carrier to leave the fixing carrier to return to the spare usage area, further comprising:
   transmitting an indication signal to replenish new fully-stored second object set to the moving carrier in the spare storage area.

7. The replenishment method of claim 5, further comprising in response to the determination that the second object set is not in the moving carrier, transmitting an alarm.

8. The replenishment method of claim 1, wherein before the controller driving the moving carrier to move the second object set in the spare usage area to the fixing carrier in the usage storage area, further comprising:
   determining whether there is an obstacle in the usage storage area;
   in response to the determination that there is the obstacle in the usage storage area, stopping the moving carrier from moving the second object set to the fixing carrier of the usage storage area and transmitting an alarm.

9. A replenishment apparatus, for an assembly line, defined with a usage storage area and a spare storage area, comprising:
   a fixing carrier, disposed in the usage storage area, configured to store a first object set capable of storing a plurality of objects;

a counter, configured to calculate a remaining number of the objects in the first object set of the usage storage area;

a moving carrier, disposed in the spare storage area, configured to store a second object set capable of storing a plurality of objects, and to move the second object set from the spare storage area to the fixing carrier of the usage storage area; and a controller, configured to execute the following steps:
  determining whether a remaining number of the object in the first object set carried in the fixing carrier is zero;
  determining whether the first object set carried in the fixing carrier has been removed;
  driving the moving carrier to move the second object set in the spare usage area to the fixing carrier in the usage storage area in response to the determination that the remaining number of objects in the first object set carried in the fixing carrier is zero and the first object set in the fixing carrier is removed; and
  moving the moving carrier to leave the fixing carrier to return to the spare usage area.

10. The replenishment apparatus of claim 9, wherein the counter is one of an infrared sensor, a wireless tag sensor, and a barcode reader.

11. The replenishment apparatus of claim 9, wherein the counter is a weight sensing device.

12. The replenishment apparatus of claim 9, wherein the counter is a touch switch.

13. The replenishment apparatus of claim 9, wherein the spare storage area further comprises a clearance sensing device, and the controller determines whether there is the second object set in the moving carrier by the clearance sensing device, only in response to the determination that there is the second object set in the moving carrier, the controller can drive the moving carrier to move the second object set to the fixing carrier of the usage storage area.

14. The replenishment apparatus of claim 9, further comprising an indication device, wherein after the moving carrier moves away from the fixing carrier to return to the spare storage area, the indication device transmits an indication signal.

15. The replenishment apparatus of claim 13, wherein in response to the determination that there is no the second object set in the moving carrier, the controller transmits an alarm.

16. The replenishment apparatus of claim 9, wherein the usage storage area further comprises a clearance sensing device, and the controller determines whether there is an obstacle in the usage storage area by the clearance sensing device, in response to the determination that there is the obstacle in the usage storage area, the controller stops driving the moving carrier to move the second object set to the fixing carrier of the usage storage area and transmits an alarm.

17. The replenishment apparatus of claim 9, wherein the fixing carrier and the moving carrier are complementary comb structures, the moving carrier goes through the fixing carrier in response to the moving carrier rotates around the fixing carrier.

18. The replenishment apparatus of claim 9, wherein the replenishment apparatus further comprises a driving device, and the driving device comprises:
  a moving unit, for moving the moving carrier close to or away from the fixing carrier under a driving state; and
  a driving unit, for rotating the moving carrier between a horizontal position and a vertical position.

* * * * *